Aug. 13, 1968    H. P. SHERLOCK    3,396,455

METHOD OF RECOVERING HEAT RECOVERABLE ARTICLES

Filed Oct. 12, 1965    3 Sheets-Sheet 1

INVENTOR.
HUGH PAUL SHERLOCK
BY
ATTORNEYS.

INVENTOR.
HUGH PAUL SHERLOCK
BY
Lyon & Lyon
ATTORNEYS.

Aug. 13, 1968 H. P. SHERLOCK 3,396,455
METHOD OF RECOVERING HEAT RECOVERABLE ARTICLES
Filed Oct. 12, 1965 3 Sheets-Sheet 3

INVENTOR.
HUGH PAUL SHERLOCK
BY Lyon Lyon
ATTORNEYS.

United States Patent Office 3,396,455
Patented Aug. 13, 1968

3,396,455
METHOD OF RECOVERING HEAT
RECOVERABLE ARTICLES
Hugh Paul Sherlock, Menlo Park, Calif., assignor to Raychem Corporation, Redwood City, Calif., a corporation of California
Filed Oct. 12, 1965, Ser. No. 495,119
17 Claims. (Cl. 29—498)

ABSTRACT OF THE DISCLOSURE

A method of installing a solder sleeve, that is, a tubular, heat shrinkable member having a solder insert therein, which comprises irradiating the solder sleeve with light energy, the wavelength band of the energy being selected so that the heat shrinkable material absorbs a sufficient fraction of the energy to cause it to shrink and transmits a sufficient portion of the energy to the solder insert to cause the latter to be raised to its fusing temperature.

This invention relates to a heating method and more particularly relates to an infrared heating device for use with heat recoverable sleeves having fusible inserts therein.

In Wetmore application Ser. No. 211,747, filed July 23, 1962, now Patent No. 3,243,211, several types of novel electrical connectors are disclosed. The electrical connectors of the Wetmore application, the disclosure of which is incorporated by reference herein, include a dimensionally heat unstable member such as a sleeve in which is placed a solder insert. In a typical connector of this type, both ends of the members or sleeves are open to receive the electrical conductors that are to be connected. Upon heating, the member or sleeve is caused to shrink and firmly grip the electrical connectors while the solder is caused to flow and form a soldered connection between the two electrical conductors. The sleeve acts to contain the movement of the solder so that a good soldered joint is assured.

In general such members or sleeves are made of a material having the property of plastic or elastic memory and are expanded under heat and pressure to a diameter greater than their normal diameter and cooled while kept under pressure. A sleeve treated in this manner will retain its expanded position until it is again heated to above its heat recovery temperature at which time it will recover to its original shape. Examples of materials useful in forming such dimensionally heat unstable recoverable members may be found in Currie Patent 2,027,962 and Cook et al. Patent 3,086,242, the disclosures of which are incorporated herein by reference. Polymeric materials which have been cross-linked by chemical means or by irradiation, for example, with high energy electrons or nuclear radiation, such as those disclosed in the Cook et al. patent are preferred for use in the present invention. Non-crystalline polymeric materials exhibiting the property of plastic or elastic memory, such as polyurethane, ionomers, etc. could also be used in practicing the present invention. The method of the present invention is equally useful for sleeves made from material having either plastic or elastic memory; consequently, as used herein, the term "elastic memory" and "plastic memory" are used interchangeably and are intended to be mutually inclusive.

In installing connectors of this type, which for convenience will hereinafter be referred to as solder sleeves, heat is usually applied by the use of a combination of convection and conduction heating. A hot air blower is brought into the vicinity of the sleeve to be installed and a stream of hot air is directed onto the sleeve. While this method provides satisfactory soldered joints, it has several disadvantages. The surface of the typical heat recoverable sleeve cannot be heated above approximately 600° F. without damage occurring. The solder insert acts as a large heat sink and requires that a significant amount of energy be transferred to it before it melts. However, the plastic of the sleeve is a poor thermal conductor and hence the time required for the melting of the solder cannot be decreased beyond a relatively long period, typically on the order of 10 to 20 seconds. This long heating cycle caused high production costs and, in some cases, results in scorching of the sleeve. In addition, to form the best quality soldered joints, it is desirable to heat the metals to be soldered to a temperature equal to or above the melting temperature of the solder prior to the solder melting. It is thus desirable to heat the wires or electrical conductors to be joined as well as the solder itself. The hot air method does not achieve this to the desired extent. Shorter heating cycles and better internal heating of the wires have been achieved by supplementing the hot air heating with induction heating but the equipment required is complex, costly, and requires precise control.

It is therefore an object of the present invention to provide an improved method for installing heat recoverable sleeves having fusible inserts.

It is another object of the present invention to provide a method for simultaneously applying heat energy to a heat recoverable sleeve and to a fusible insert positioned therein.

It is a further object of the present invention to provide a method for simultaneously applying heat energy to a heat recoverable sleeve, to a fusible insert positioned within the sleeve, and to an object or substrate on which the sleeve is to be installed.

These and other objects and advantages of the present invention will become more apparent upon reference to the accompanying description and drawings in which.

Figure 1:
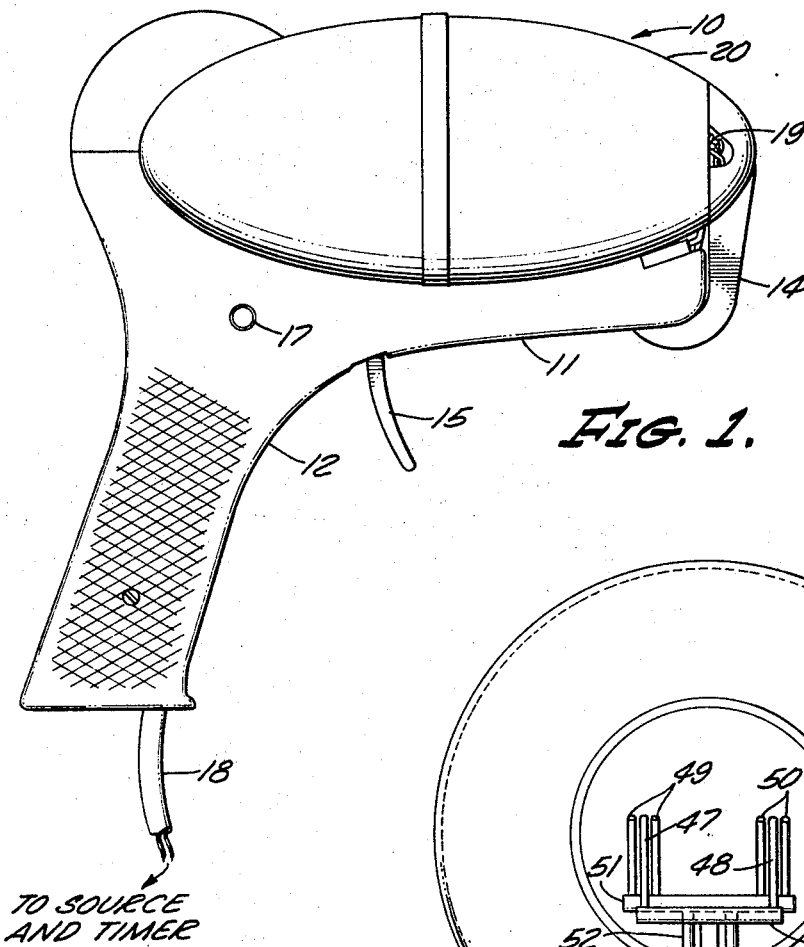
FIGURE 1 is a side elevation of the heating device of the present invention.
Figure 5:
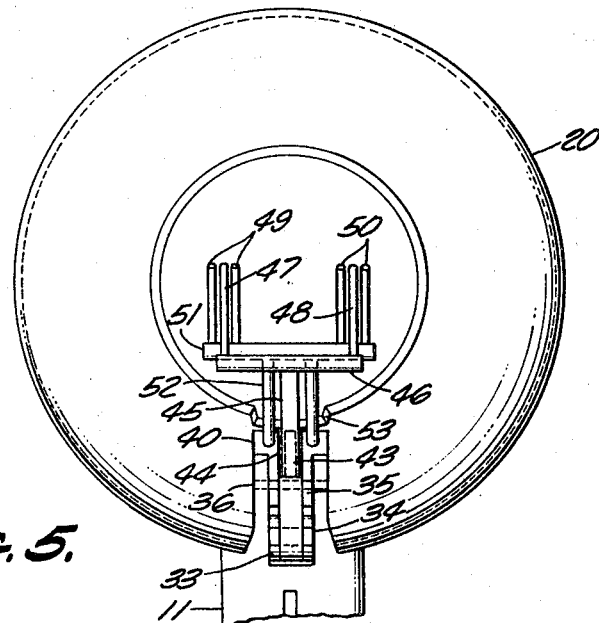
FIGURE 5 is a front elevation of the device of FIGURE 1 with the tip portion and solder sleeve removed.
Figure 2:
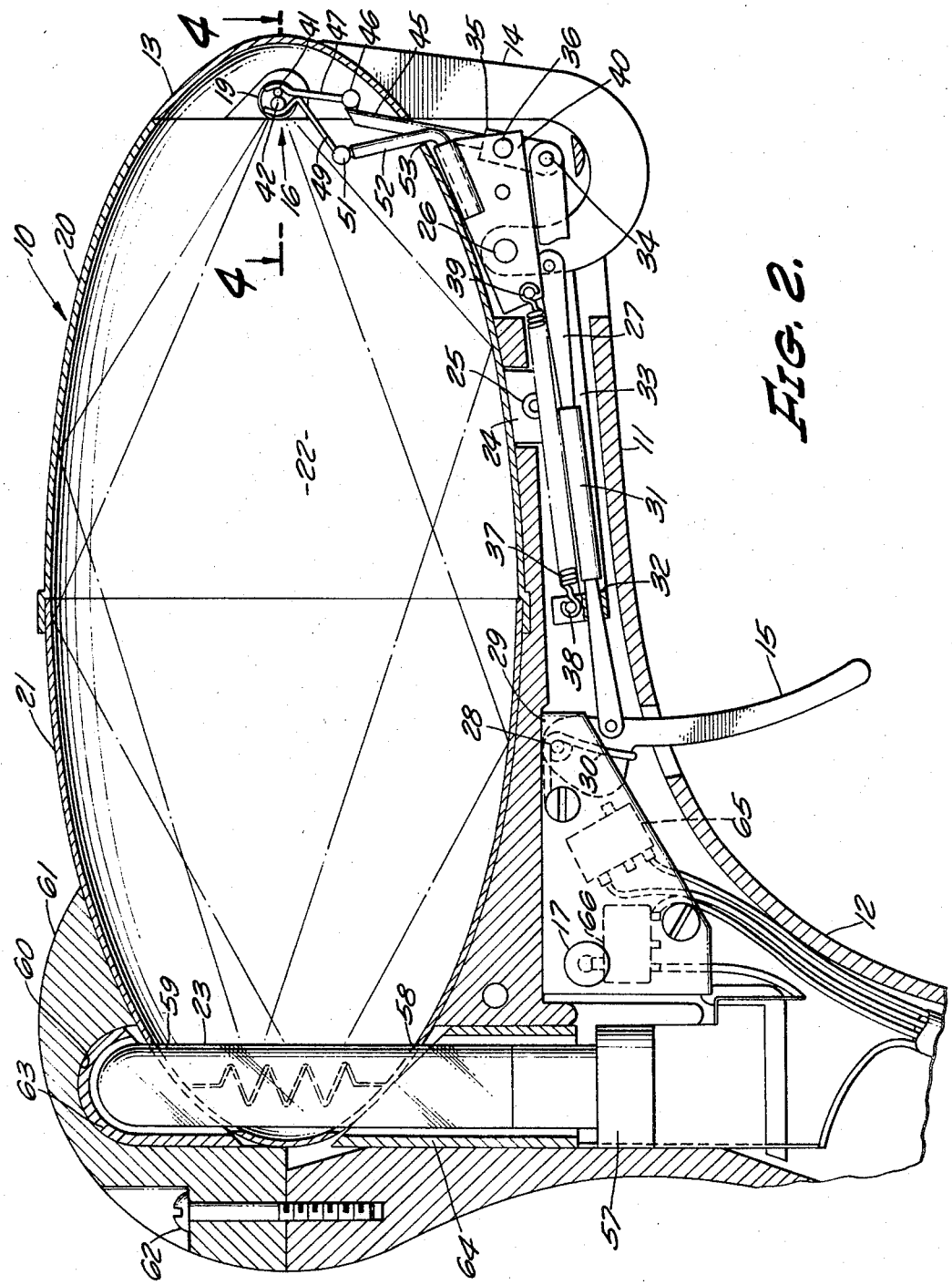
FIGURE 2 is a cross-sectional view of the heating device of FIGURE 1.

Briefly, the present invention achieves the aforementioned objects by utilizing radiant heating in place of conduction heating. Since the material from which heat recoverable sleeves are made is or can be transparent to a certain degree, it is possible to so relate the composition of the sleeving material to the wave length band of a source of infrared radiation that a fraction of the radiant energy reaching the sleeve will be absorbed by the sleeving material and the remainder passed to the fusible insert positioned therein. This fraction of energy absorbed can be made just large enough to raise the temperature of the sleeving material to its heat recovery temperature just before enough energy has been traismitted to the insert to raise it to its melting or flowing temperature. Some of the energy also may be passed through the insert to the object on which the sleeve is mounted, e.g., the braid on a coaxial cable. This permits the object or substrate on which the sleeve is to be installed to be raised in temperature, as is desired, for example, when a solder joint is to be formed. Consequently, the sleeve will begin to recover just before the insert flows with the result that the sleeve will control the flow of the insert. Since the energy transfer to the insert is substantially instantaneous, the time required for it to reach its melting point, and consequently the time required for the installation of the sleeve, is greatly reduced as it is no longer dependent upon the thermal conductivity characteristics of the sleeving material, which as pointed out above, are relatively poor. Furthermore, the sleeve itself will not be damaged as a result of the energy being transmitted through it. In situations where the fusible insert or the sleeve itself is transparent to infrared radiation, an absorber can be added to it, for example, carbon black sold under the name "Thermax" by Commercial Solvents Corporation can be added to polyethylene.

Turning now to the drawing, the details of the heating tool useful in performing the method of the present invention are illustrated. This tool is not my invention but is the invention of Ralph S. Foreman, Ronald E. Switzer, Kenneth J. Spiller and Donald R. Allen and is claimed in a United States patent application entitled "Heating Device," filed by them on the same day as this application and assigned to the assignee of the present application.

As shown in FIGURE 1, the reflector 10 is mounted on a frame 11 having a handle or pistol grip 12. An end or tip portion 13 of the reflector 10 is unconnected to the remainder of the reflector and is mounted on an arm 14 which can be moved to move the tip 13 away from the remainder of the reflector 10 by depressing a trigger 15. The forward end of the reflector 10 is provided with a work holding mechanism, generally indicated at 16, which is accessible when the tip 13 is moved away from the remainder of the reflector. A push button 17 is provided on the side of the frame 11 at the upper end of the handle 12 for actuating the energy source positioned within the reflector 10. A cable 18 connects the heating device to a source of power and a suitable timer. A solder sleeve 19 is shown in position in the work holding mechanism 16.

The details of the heating device shown in FIGURE 1 are illustrated more clearly in FIGURES 2 through 5. The reflector 10 is made up of two sections 20 and 21 which, together with the tip section 13, make up a closed chamber 22. The reflector is ellipsoidal in configuration and has a lamp 23 positioned at one focal point and the work holding mechanism 16 positioned in the vicinity of the other focal point. The rays from the lamp 23 are focused by the surface of the reflector at the forward focal point and thus substantially all of the radiant energy emitted by the element of the lamp 23 at the rear focal point is brought to bear on the solder sleeve 19 positioned by the work holding mechanism 16 at the forward focal point. For good reflectivity, the inner surface of the reflector 10 is preferably highly polished gold plating. The lamp 23 may be any suitable lamp, for example, a Sylvania 500 watt iodine quartz lamp, model 500 Q/CL. This lamp is preferably operated at approximately 110 volts. Its wave length distribution is such that over 95% of its energy is from 0.4 to 4.2 microns with a peak of about 0.97 micron. The reflector sections 20 and 21 are telescoped to form a good reflective surface and are attached to the frame 11 by means of a tab 24 and a pin 25. It should be understood that while an ellipsoidal reflector is shown, other shapes could also be used. For example, the reflector could be made to have a generally oval cross-section so that the heating zone would be elongated.

Figure 3:
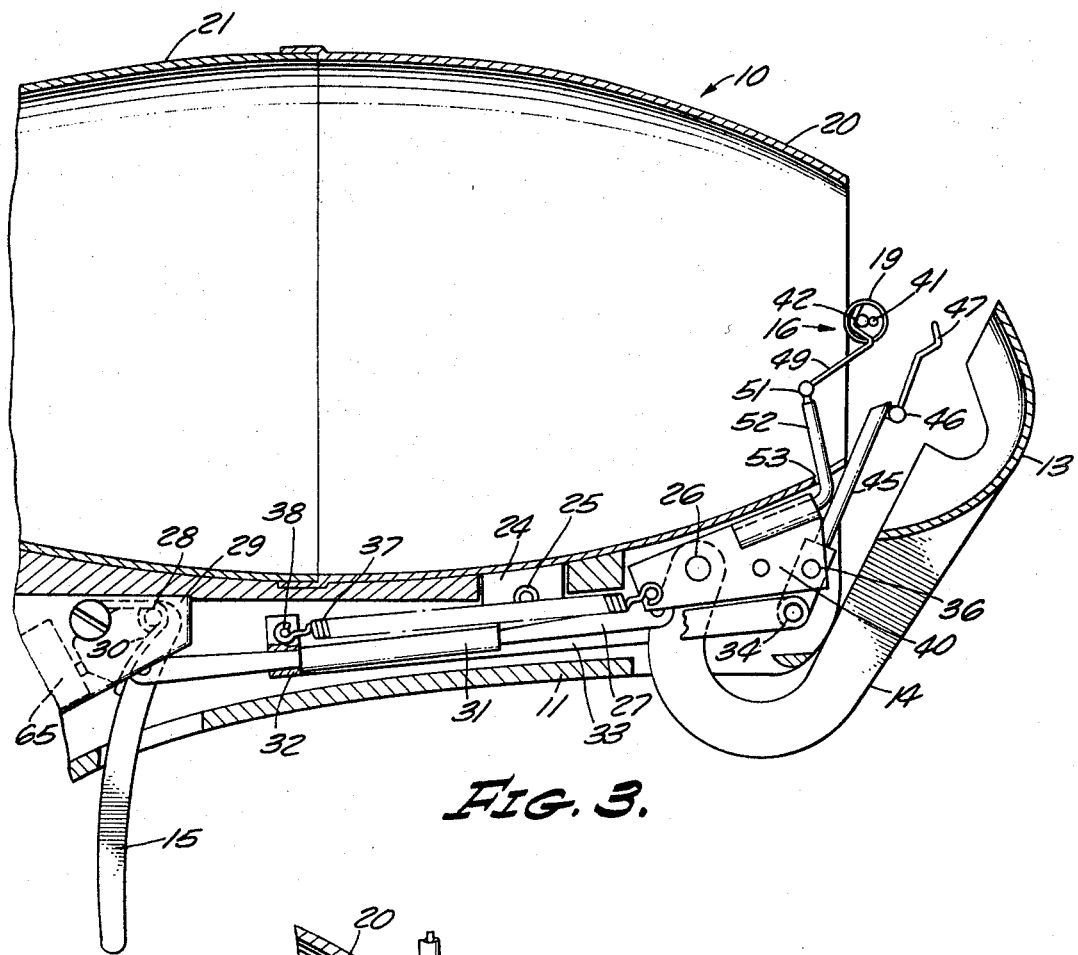
FIGURE 3 is a partial cross-sectional view showing the heating device of FIGURE 2 in its opened position.

The tip portion 13 of the reflector 10 is welded or otherwise fastened to one end of the U-shaped arm 14, the other end of the arm 14 being pivoted about a pin 26. An adjustable actuating rod 27 has one end connected to the arm 14 and the other end connected to the trigger 15. The trigger 15 is pivotally mounted about a pin 28. A housing 29 is mounted with two screws within the frame 11. A spring 30 is provided for urging the trigger 15 in the forward direction so that the rod 27 normally causes the arm 14 to keep the tip portion 13 in engagement with the remainder of the reflector 10. As shown in FIGURE 3, when the trigger 15 is depressed, or pulled back towards the handle 12, the rod 27 pivots the arm 14 about the pin 26 with the result that the tip portion 13 is moved away from the remainder of the reflector 10 exposing the work holding mechanism 16.

The rod 27 is provided with a block 31 so that when the trigger 15 is depressed the block 31 is moved until it engages a shoulder 32 on a generally &-shaped bar 33. The forward ends of the bar 33 are mounted by a pin 34 to a lever 35 which is pivotally mounted on a pin 36. When the trigger 15 is further depressed, the bar 33 is moved and causes the lever 35 to pivot about the pin 36. The first portion of the travel of the rod 27 causes the arm 14 to be pivoted around pin 26 so that the tip portion 13 is moved a short distance away from the remainder of the reflector exposing the work holding mechanism 16. The second portion of the travel of the rod 27 causes the work holding mechanism 16 to release the solder sleeve 19.

A spring 37 is mounted on a pin 38 on the member 33 and on a pin 39 on a block 40 and is provided for urging lever 35 in the counter clockwise direction when trigger 15 is released. The result is that the mechanism 15 closes on cables 41 and 42 and holds them in position before the tip portion 13 is completely closed. This provides a visual check on the position of solder sleeve 19 and cables 41 and 42 in relation to each other and in relation to the focal point of the closed chamber 22 prior to the closing of the tip portion 13.

The work holding mechanism 16 includes a member 43 mounted on the lever 35 and extending through a slot 44 formed in the front of block 40. A tube 45 is slip fit on the member 43 and has attached thereto a horizontal mounting rod 46. A pair of heavy wires 47 and 48, formed to cradle the cables 41 and 42, are attached to the rod 46. Another pair of loops or cradles for the cables 41 and 42 are formed by pairs of stiff wires 49 and 50 which are attached to a horizontal mounting rod 51 which is held by two rods 52 which extend through a slot 53 in section 20 of the reflector 10, then bend around the reflector section 20. The ends of the rods 52 are inserted into two holes in the block 40. When the lever 35 is pivoted by backward movement of member 33, the wires 47 and 48 are moved away from the wires 49 and 50 releasing the solder sleeve 19 and cables 41 and 42.

Figure 4:
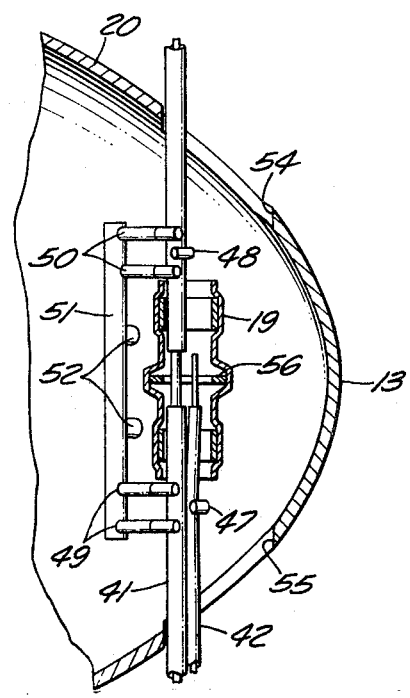
FIGURE 4 is a cross-sectional view taken along lines 4—4 of FIGURE 2.

As can best be seen in FIGURE 4, the tip portion 13 is provided with apertures 54 and 55 through which the electrical conductors, such as cables 41 and 42, or other objects to be connected, may pass. The ends of the cables 41 and 42 are positioned within a solder insert 56 of the solder sleeve 19.

The lamp 23 is mounted in a socket 57 positioned in the handle 12 adjacent the housing 29. In order to receive the lamp 23, section 21 of the reflector 10 is provided with a pair of aligned apertures 58 and 59. The upper portion of the lamp 23, that is, the portion beyond the reflector section 21, extends into a cavity 60 formed in a cap 61. The cap 61 is mounted in any suitable fashion to the handle 12, for example, by means of a screw 62. Preferably, the cavity 60 is lined with a ceramic insulating material 63. The portion of the lamp 23 which extends below the reflector section 21 is also preferably surrounded by ceramic insulating material 64. When the lamp 23 needs to be replaced, all that is required is that the cap 61 be removed and the lamp unscrewed from the socket 57 and replaced. The cap 61 is then replaced and the device is again ready for use.

The housing 29 has mounted therein a pair of microswitches 65 and 66. The micro-switch 65 is normally closed and is opened when the trigger 15 is depressed. This breaks the power circuit to the lamp 23 and insures that the lamp cannot be energized when the tip portion 13 is displaced from the remainder of the reflector 10. The micro-switch 65 is normally open and is closed by pushing the push button 17. When the push button 17 is depressed, and the trigger 15 is in the normal position, the circuit to the lamp 23 is completed and the lamp is illuminated. The circuit is provided with a third switch located in the timer which opens the circuit after the passage of a predetermined time interval. As pointed out above, this interval can be set in accordance with the characteristics of the solder sleeve being installed, for example, the composition of the material of the sleeve and the mass of the solder insert. If desired, the timer may be located in the handle 12 or elsewhere in the frame 11 to eliminate the need for an external timer and permit the heating device to be simply plugged into any conventional electrical outlet.

As a typical example of the operation of this invention, a sleeve of the type used in a Type D144–01 Solder Sleeve sold by Rayclad Tubes, Inc. of Redwood City, Calif., having an axial length of 5/8 inch, an inside diameter of 0.20 inch and a wall thickness of 0.010 inch was provided with a solder insert of the following composition: tin 63%, lead 37%; having a mass of 0.1 gram. Using the apparatus described above, it took 0.75 second for the sleeve to be heated to its recovery temperature of 347° F. and approximately 0.5 further seconds for the solder insert to melt and flow. When a solder sleeve is actually installed, the irradiation must be continued until proper solder wetting of the conductors or other substrate is achieved.

From the foregoing description, it can be seen that an improved process has been developed for providing sufficient energy to a heat recoverable sleeve to cause it to recover while simultaneously providing sufficient energy to a solder insert positioned within the sleeve to cause it to reach its melting temperature just after the sleeve begins to recover. Energy can also be provided to the substrate in this manner so that a good solder joint is obtained. It should be understood that while the invention has been described in terms of a sleeve having a solder insert, it is equally useful in connection with a sleeve having any type of fusible insert. If the insert is solder, the sleeving material must exhibit elastomeric properties at at least its recovery temperature. In the foregoing description and in the following claims, it has been assumed that all the energy not absorbed by the sleeve is transmitted to the insert or to the substrate or object on which it is installed. While this is not exactly true because of a small amount of reflection from the surface of the sleeve and some internal scattering, the assumption is substantially true and for all practical purposes accurate as the amount of reflected energy is quite small.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A method of installing an article comprising a tubular sleeve of a material having the property of elastic memory and a fusible insert positioned within said sleeve comprising:
   irradiating said sleeve and said insert with light energy, the wavelength band of said energy being such that said material absorbs a fraction of said energy and transmits the remainder to said insert, said transmitted energy being sufficient to raise said insert to its fusing temperature and said fraction being sufficient to raise said material to its recovery temperature.

2. The method of claim 1 wherein said fraction is sufficient to raise said material to its recovery temperature prior to the fusing of said insert.

3. The method of claim 1 wherein said material is a cross-linked polymer.

4. The method of claim 3 wherein said material is an irradiated polymer.

5. The method of claim 1 wherein said fusible insert is provided with an energy absorbing material.

6. A method of installing on an object an article comprising a tubular sleeve of a material having the property of elastic memory and a fusible insert positioned within said sleeve comprising:
   irradiating said sleeve and said insert with light energy, the wavelength band of said energy being such that said material absorbs a fraction of said energy and transmits the remainder to said insert and said object, said transmitted energy being sufficient to raise said insert to its fusing temperature and to raise the temperature of said object, and said fraction being sufficient to raise said material to its recovery temperature.

7. The method of claim 6 wherein said fraction is sufficient to raise said material to its recovery temperature prior to the fusing of said insert.

8. The method of claim 6 wherein said fusible insert is provided with an energy absorbing material.

9. A method of installing a solder sleeve comprising a tubular sleeve of a material having the property of elastic memory and a solder insert positioned within said sleeve comprising:
   irradiating said sleeve and said insert with light energy, the wavelength band of said energy being such that said material absorbs a fraction of said energy and transmits the remainder to said insert, said transmitted energy being sufficient to raise said solder insert to its melting temperature and said fraction being sufficient to raise said material to its recovery temperature.

10. The method of claim 9 wherein said fraction is sufficient to raise said material to its recovery temperature prior to the melting of said solder insert.

11. The method of claim 10 wherein said material exhibits elastomeric properties when heated to at least its recovery temperature.

12. The method of claim 11 wherein said material is a cross-linked polymer.

13. The method of claim 12 wherein said material is an irradiated polymer.

14. A method of electrically connecting a plurality of electrical conductors with a solder sleeve comprising an independently dimensionally heat unstable tubular member of a material exhibiting elastomeric properties at at least its recovery temperature and a solder insert positioned within said sleeve comprising:
   inserting said conductors into said sleeve in the vicinity of said insert;
   irradiating said member, said insert and said conductors with infrared light energy, the wavelength band of said energy being such that said material absorbs a minor fraction of said energy and transmits the remainder to said insert and said conductors, said transmitted energy being sufficient to raise said solder insert to its melting point and said conductors to the soldering temperature, and said absorbed energy being sufficient to raise said material to its recovery temperature prior to the melting of said solder insert; and
   terminating said irradiation immediately after proper solder wetting of said conductors is achieved.

15. A method of installing on a metallic object a solder sleeve comprising a tubular sleeve of a material having the property of elastic memory and a solder insert positioned within said sleeve comprising:
   irradiating said sleeve and said insert with light energy, the wavelength band of said energy being such that said material absorbs a fraction of said energy and transmits the remainder to said insert and said object, said transmitted energy being sufficient to raise said solder insert to its fusing temperature and to raise the temperature of said object to the necessary soldering temperature, and said fraction being sufficient to raise said material to its recovery temperature.

16. The method of claim 15 wherein said fraction is sufficient to raise said material to its recovery temperature prior to the fusing of said insert.

17. A method of installing a solder sleeve comprising an independently dimensionally heat unstable tubular member capable of assuming a heat stable condition and predetermined dimensions upon the application of heat alone and exhibiting elastomeric properties at at least its recovery temperature and a solder insert positioned within said sleeve, comprising:
focusing the radiation produced by a source of infrared energy at a focal point;
preselecting a time interval during which said source will be energized, said time interval being dependent upon the absorption and transmission characteristics of said member and the wavelength band of said radiation;
positioning said solder sleeve approximately at said focal point; and
irradiating said member and said solder insert with said infrared energy for said preselected time interval, the wavelength band of said energy being such that said member absorbs a minor fraction of said energy and transmits the remainder of said energy to said solder insert, said transmitted energy being sufficient to raise said solder insert to its melting temperature within said time interval and said absorbed energy being sufficient to raise said member to its recovery temperature prior to the melting of said solder insert.

References Cited

UNITED STATES PATENTS

| | | | |
|---|---|---|---|
| 2,739,829 | 3/1956 | Pedlow et al. | 53—30 X |
| 2,783,599 | 3/1957 | Weikert | 53—30 |
| 2,790,285 | 4/1957 | Pike et al. | 53—42 X |
| 3,037,529 | 6/1962 | Hancik | 138—109 |
| 3,187,088 | 6/1965 | Warner | 174—84 X |
| 3,226,807 | 1/1966 | Orr. | |
| 3,242,314 | 3/1966 | Eckles | 219—347 |
| 3,243,211 | 3/1966 | Wetmore | 287—78 |
| 3,283,124 | 11/1966 | Kawecki | 219—347 |
| 3,320,355 | 5/1967 | Booker | 228—56 X |
| 3,326,442 | 6/1967 | Fattor | 228—56 |

OTHER REFERENCES

Manko: Solders and Soldering, McGraw-Hill, April 1964, pp. 202–204.

JOHN F. CAMPBELL, *Primary Examiner.*

JOHN L. CLINE, *Assistant Examiner.*